(12) United States Patent
Parambil et al.

(10) Patent No.: US 10,915,411 B2
(45) Date of Patent: Feb. 9, 2021

(54) ADVANCED MULTIPLE BACKUP RECOVERY

(71) Applicant: EMC IP Holding Company LLC, Hopkinton, MA (US)

(72) Inventors: Shahid Paloth Parambil, Calicut (IN); Sharath Talkad Srinivasan, Brundavanagar Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 177 days.

(21) Appl. No.: 16/007,948

(22) Filed: Jun. 13, 2018

(65) Prior Publication Data

US 2019/0384679 A1      Dec. 19, 2019

(51) Int. Cl.
*G06F 11/14*      (2006.01)
*G06F 9/455*      (2018.01)

(52) U.S. Cl.
CPC ...... *G06F 11/1469* (2013.01); *G06F 9/45558* (2013.01); *G06F 11/1464* (2013.01); *G06F 2009/45583* (2013.01)

(58) Field of Classification Search
CPC .................................................. G06F 11/1469
See application file for complete search history.

(56) References Cited

U.S. PATENT DOCUMENTS

| | | | |
|---|---|---|---|
| 2010/0211944 A1* | 8/2010 | Kaneda | G06F 9/44505 717/174 |
| 2018/0203742 A1* | 7/2018 | Antony | G06F 11/0793 |
| 2018/0373597 A1* | 12/2018 | Rana | G06F 16/907 |

* cited by examiner

*Primary Examiner* — Van H Oberly
(74) *Attorney, Agent, or Firm* — Womble Bond Dickinson (US) LLP (57) ABSTRACT

A system for providing multiple restore points on a virtual machine includes maintaining a record of a plurality of restore points of virtual machines. Upon receiving a request from a user to access a plurality of restore points of a virtual machine, the system can mount a plurality of backup disks onto a target virtual machine and then notify the user.

20 Claims, 7 Drawing Sheets

ADVANCED MULTIPLE BACKUP RECOVERY

FIELD OF THE INVENTION

Embodiments of the present invention relate generally to data storage systems. More particularly, embodiments of the invention relate to virtual machine (VM) image backup.

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). Different types of VM backup and recovery options exist.

Users can search backup disks of a VM, but the recover option is singular (e.g., full VM recovery, revert VM, or IA recovery). Often times, however, a user may not know which recovery option to select, especially if a particular file or file state is being searched for.

This issue can be exacerbated because backup disks or restore points are saved in a scheduled or unscheduled manner that is often not visible to or tracked by a user of the VM. If a user is unaware of the exact changes happening in during backups, the user may have to search multiple backups to find the proper file or file-state. In this regard, has to recover multiple VMs separately to get the desired data which he is looking for from the backups or perform file level recovery (FLR) operation to each incremental backup sessions of the VM to see if the data is available.

If a production VM becomes corrupt for some reason, an administrator/user may first try to recover the VM using a recover VM option. In this case, a single backup disk may be mounted on a VM. A user can search the files on the backup disk. If the files are not found in the present backup, the user can repeat the process of mounting and unmounting different backup disks multiple times to search for the files. This process can be time consuming and burdensome to bring up the production VM as required.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

It is to be understood that certain terms as used herein such as "host" and "server", "backup disk" and "restore point" and "data store", can be used interchangeably, unless context dictates otherwise.

According to some embodiments, a client has a virtual machine monitor or manager (VMM), and each hosts one or more virtual machines (VMs). The client has a storage system associated with it to store data and an application programming interface (API) via which the VMs are managed. An example of VM API is VMware's vStorage APIs for Data Protection (VADP). A request for backing up a VM is sent from a backup application to the client. The VMM, in response to a request to back up a VM to a backup storage system, establishes a consistent state of the VM and generates a snapshot of the VM, also described herein as a "restore point". The VMM identifies one or more files within the snapshot that satisfy a predetermined criterion. If the one or more file is identified, the VMM dynamically backs up a modified representation of the snapshot (e.g., the snapshot excluding one or more files within the snapshot in substitution with a predetermined data pattern) by analyzing the snapshot to determine start and end addresses of the identified one or more files within the snapshot and substituting content of the identified one or more files at the determined addresses with a predetermined data pattern. In one embodiment, an Avamar client processes the backup data by deduplicating duplicate data segments or trunks (e.g., 64 KB). For the substituted one or more files with predetermined data pattern (e.g., repeated 64 KB data trunks), only one copy of the data trunk (e.g., 64 KB) will be sent to the target backup storage system, only once. The removed duplicates will reference the only copy. Therefore, transmitting the substituted one or more files with predetermined data pattern reduces the overall transmission bandwidth and overall server storage capacity.

In one embodiment, the backup application can use VM API to ask the VMM to delete the snapshot after the backup process completes or terminates, which causes the snapshot to be deleted from a storage system. In one embodiment, backing up the modified representation of the snapshot includes parsing the modified representation of the snapshot at a storage system to populate a file catalog. In another embodiment, the modified representation of the snapshot is reconstructed from the deduplicated modified representation of the snapshot to parse the modified representation of the snapshot at the target backup storage system to populate a file catalog. Metadata in the snapshot are interpreted to determine information about the files contained in the snapshot. Such information includes file attributes such as file name, access control information, and information about layout of the file within the disk snapshots. Such information is then used to populate a backup catalog of the files in the backed up VM.

In one embodiment, the request for backing up a VM is sent from a backup application of the storage system associated with the clients. In another embodiment, the request for backing up a VM is sent from a backup application server. In another embodiment, the request for backing up a VM is sent from a VM Management server that manages multiple clients over a network, each client containing one or more VMs and each client has access to storage system. In one embodiment, the VM Management server can be a part of the backup application server. In another embodiment, the request for backing up a VM is sent from a backup application of the target backup storage system.

In one embodiment, a method is performed by a computing device, for example, a backup server. The method includes: maintaining a record of restore points of virtual machines (VM); in response to a request from a user to access requested restore points of a selected VM: initiating a backup storage to build the restore points and be ready to export addresses to the restore points; based on the addresses, mounting backup disks onto a target VM, the mounted backup disks containing image disks of the requested restore points of the selected VM; and notifying a user that the target VM has backup disks mounted.

In another embodiment, mounting of the backup disks onto the target VM includes: initiating a proxy virtual machine located on a virtual machine manager to: locate the target virtual machine at the VM server; install a file level recovery (FLR) agent on the target virtual machine; export the addresses over the network to the VM manager to mount the backup disks to the VM manager; add one or more virtual storage controllers to the target virtual machine, if necessary, the one or more virtual storage controllers capable of receiving one or more backup disks; and mount the one or more backup disks to the one or more virtual storage controllers.

Figure 1:
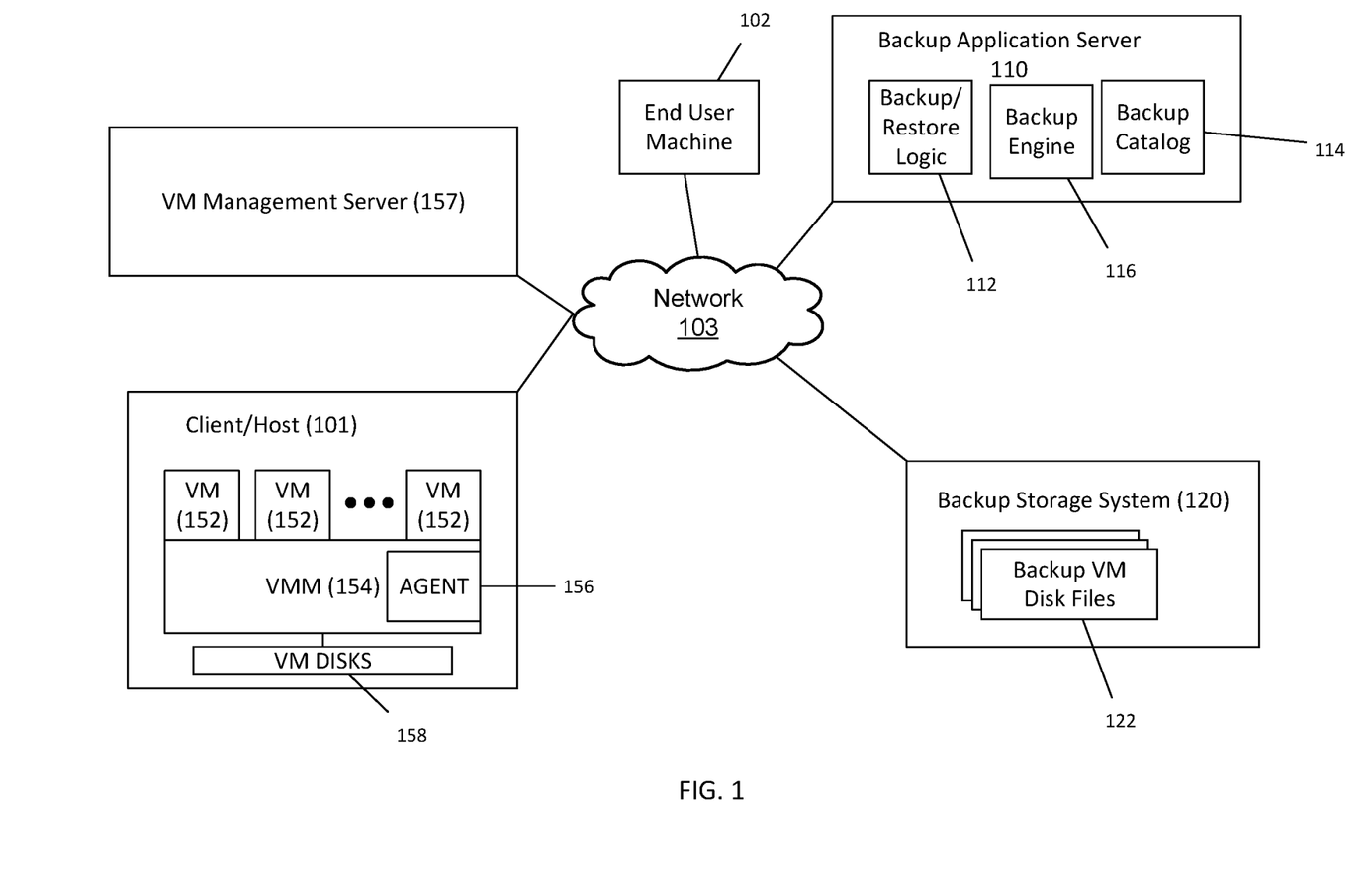
FIG. 1 is a block diagram illustrating a networked system of VM management and backup storage according to one embodiment.
Figure 2:
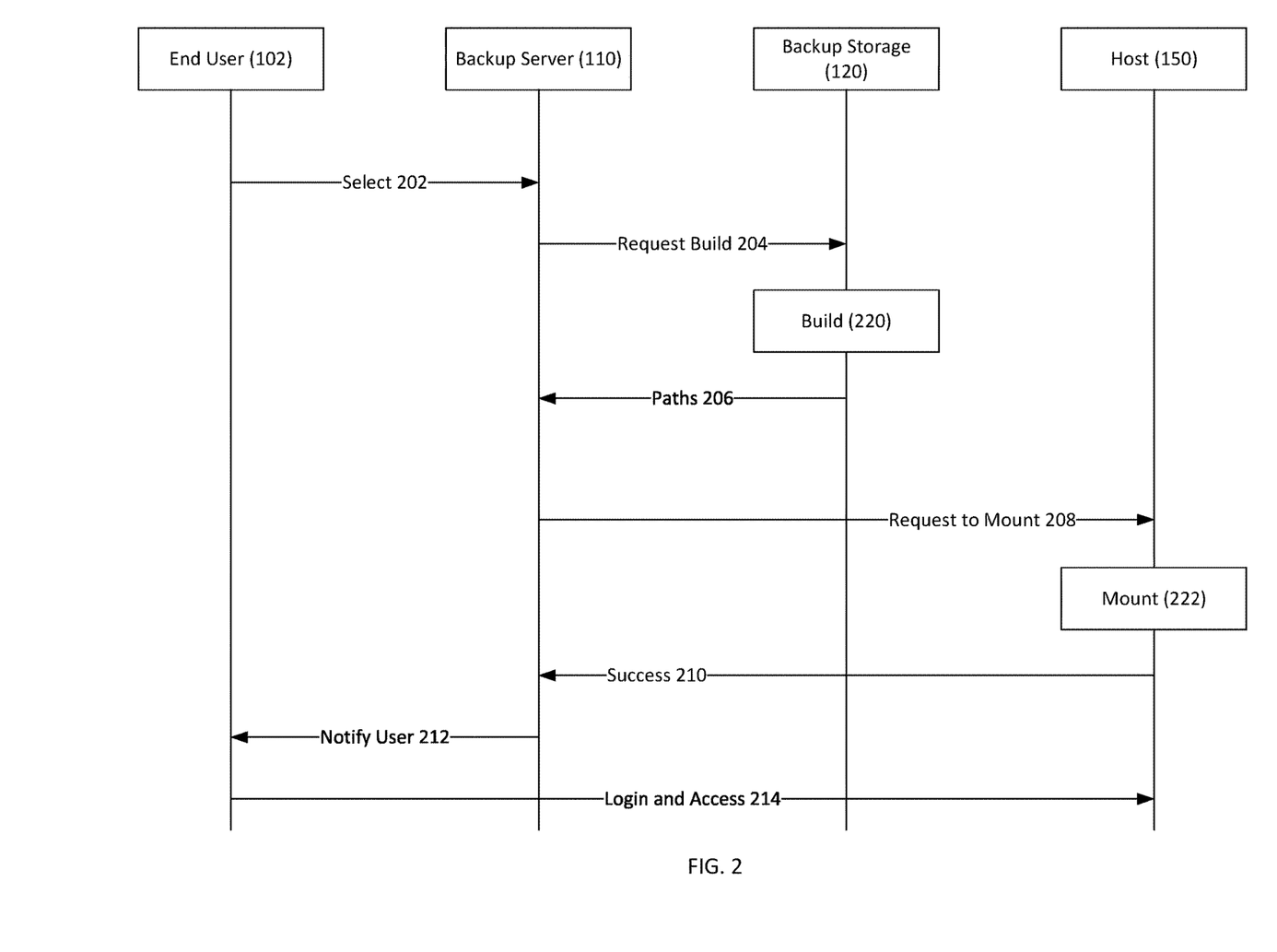
FIG. 2 is a sequence diagram illustrating users, backup servers, backup storage and hosts according to one embodiment.

Referring now to FIGS. 1 and 2, in one embodiment, a user, for example, an administrator, on an end user machine 102 can access a backup application server 110 to restore a target virtual machine (VM). The target VM can be one of the virtual machines 152 that reside on host/client 101.

The backup server may maintain a record of restore points in backup catalog 114, the restore points corresponding to production VMs. The end user may then select via path 202 restore points to search or browse through.

In response to the request from the user, the backup server 110 sends a request via path 204 to the backup storage system to build the restore points. After the backup storage system 120 builds the restore points at block 220 on backup VM disk files 122, the backup application can receive/retrieve via path 206 the addresses (for example, network addresses) of each of the backup VM disk files 122 that were built, the addresses corresponding to the requested restore points.

Figure 5:
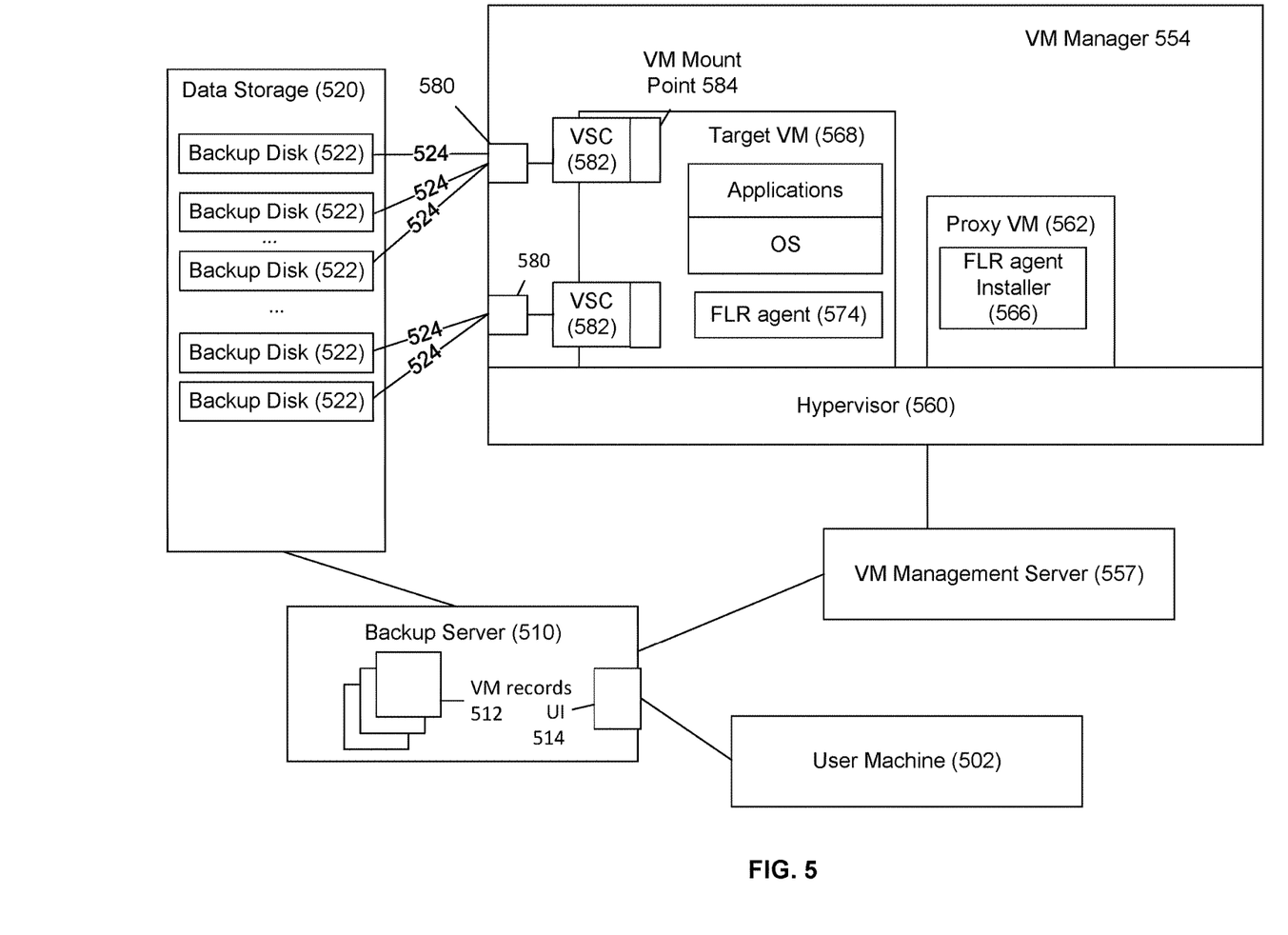
FIG. 5 is a block diagram illustrating a networked system of VM management and backup storage according to one embodiment.

Based on the retrieved network addresses, the backup server 110 can mount one or more backup disks 158 onto mount points of a target VM where the backup disks 158 contain the requested restore points. For example, the backup server 100 can request via path 208 that the host 150 mounts backup VM disk files 122. The host, with the help of a proxy VM (as shown in FIG. 5) can mount 222 the VM disk files 158 on a target VM (one of the VMs 152). The backup server can determine via path 210 whether the mount was successful, either by receiving a communication from the host 150 or by monitoring the target VM on the host through known protocols.

The backup application server can then notify via path 212 the end user machine 102 that the target VM (one of the VMs 152) has multiple mounted disks 158 that are ready to be searched or accessed by the user. A user may then login and access the VM via path 214 through the host 150 or search the mounted disks (for example, for a file) through a user interface provided by the backup server.

Rather than communicate directly with the host 150, the backup management server, end user machine, and backup storage system can communicate with a VM management server 157. The VM management server 157 can manage multiple client/hosts 150.

As shown in FIG. 1, the system 100 includes, but is not limited to, a host 150, a storage system 120, a backup server 110, a VM Management server 157 (also referred to as virtual center or vCenter), and storage system 120 over a network 103. Although not shown, there can be multiple hosts 101.

The host can be a server, a personal computer (e.g., desktops, laptops, and tablets), a "thin" client, a personal digital assistant (PDA), a Web enabled appliance, or a mobile phone (e.g., Smartphone), etc. Alternatively, any of hosts 150 may be a primary storage system (e.g., local data center) that provides storage to other local clients, which may periodically back up the content stored therein to a backup storage system (e.g., a disaster recovery site or system), such as backup storage system 120.

Network 103 may be any type of networks such as a local area network (LAN), a wide area network (WAN) such as the Internet, a fiber network, a storage network, or a combination thereof, wired or wireless.

Backup storage system 120 may include or represent any type of servers or a cluster of one or more servers (e.g., cloud servers). For example, backup storage system 120 may be a storage server used for various different purposes, such as to provide multiple users or client systems with access to shared data and/or to back up (or restore) data (e.g., mission critical data). Backup storage system 120 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Backup storage system 120 may further provide storage services via an object-based protocol and Hadoop distributed file system (HDFS) protocol.

In one embodiment, backup application server 110 includes, but is not limited to, backup engine 116 which contains a backup catalog 114 and backup logic 112. Backup application server 110 coordinates with backup storage system 120, and client(s) 101 to run various backup operations. Backup logic 112 includes backup logic configured to receive and back up data from the host 150 and to store the backup data in any one or more of storage units 122, and restore logic configured to retrieve and restore backup data from any one or more of storage units 122 back to a client/host 150.

In one embodiment, VM Management server 157 manages VM configuration information of client/host 150. A VM Management server may manage VM configuration information of multiple hosts, and each host contains one or more VMs managed by a VMM running therein. A VM Management server may be communicatively coupled with hosts, backup application server, and backup storage systems. VM Management server 157 may obtain VM information through various ways. For example, VM Management server may remotely synchronize with VMMs within the network, or VMMs may update VM Management server whenever status change happens with VMs. In this example, VM Management server is communicatively coupled with backup application server 110 and host(s) 150.

Backup or restore points of a VM 152 can be saved onto a backup VM disk file(s) 122 of backup storage system 120. In one embodiment, VM Management server 157 and backup application server 110 may be integrated as a single system.

Backup storage unit 120 may be implemented locally (e.g., single node operating environment) or remotely (e.g., multi-node operating environment). It may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. It may be located locally or remotely accessible over a network. Note that in one embodiment, backup application server 110 and backup storage unit 120 are integrated into one single system.

Metadata enabling the reconstruction of a backup disk/restore point can be stored, maintained and organized in the backup management server 110. As a result, segments of data files (e.g. the backup disk/restore point) are stored (e.g., in a deduplicated manner), either within each of across the backup VM disk files 122.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system as shown in FIG. 1 may be used as a tier of storage in a storage hierarchy that includes other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to backup data (or deduplicated data) from host(s) 150 and to store the data in one or more of Backup VM disk files 122 of the back up storage system 120.

Backup storage system 120 may include any type of server or cluster of servers. For example, storage system 120 may be a storage server used for any of various different purposes, such as to provide multiple users with access to shared data and/or to back up mission critical data. Storage system 120 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 120 may have a distributed architecture, or all of its components may be integrated into a single unit. Storage system 120 may be implemented as part of a storage system available from EMC® Corporation of Hopkinton, Mass.

Storage system 120 contains backup logic 124 that manages both backup and restore processes within the storage system. Storage system 120 also contains VM disk files 122 that are the content files of the VMs. Note that a storage system of a client may also be called the primary storage of the client to distinguish the storage from backup storage systems.

A virtual machine represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources. Here VMM 254 manages both VMs 152.

In one embodiment, backup engine 116 collects attributes associated with the VM being backed up (e.g. CPU, memory, disk configuration) and stores the VM attributes in backup catalog 114. The attributes are subsequently used to provision a new VM to be the target of restoration, e.g. a target VM.

Figure 3:
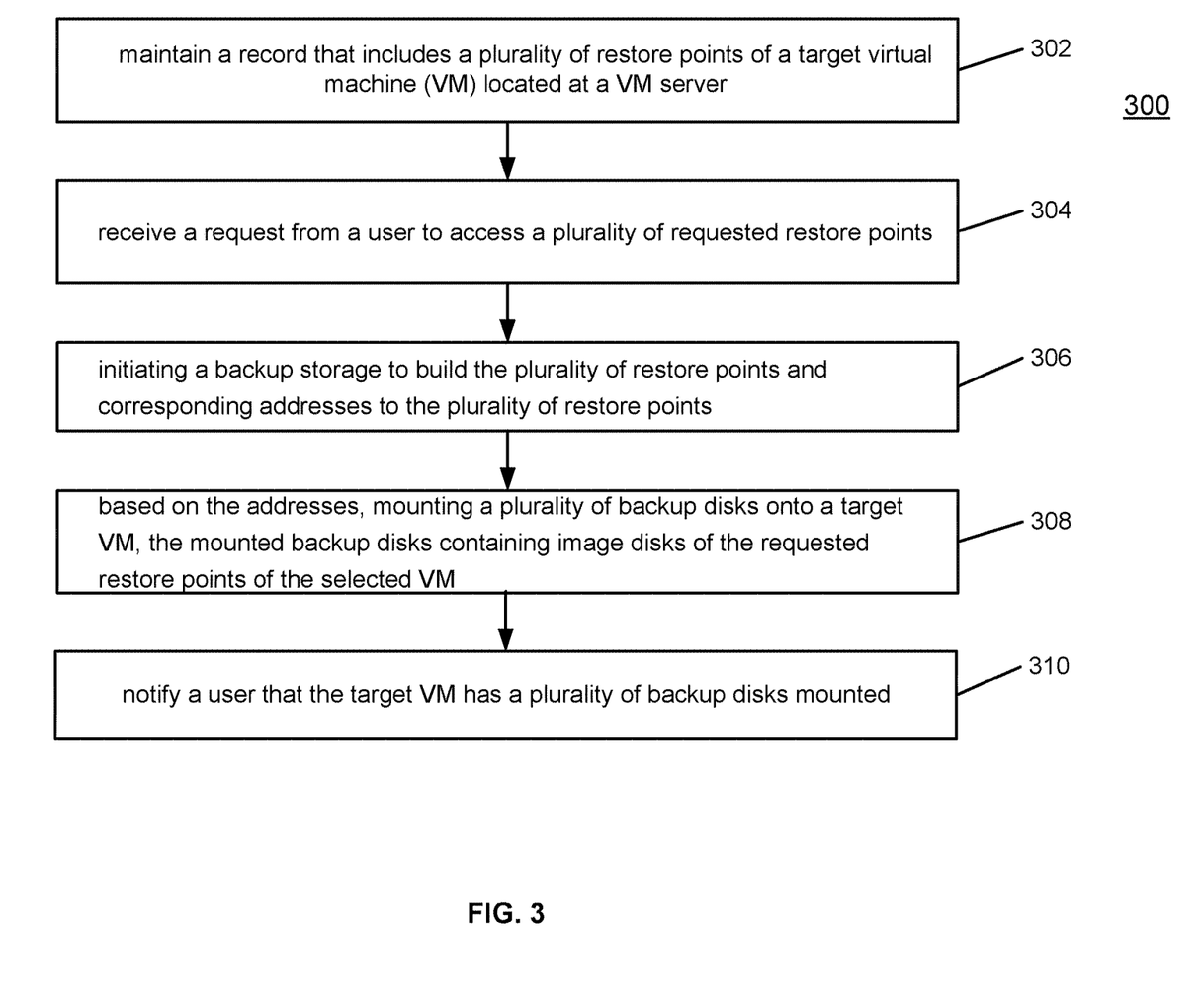
FIG. 3 is a flow diagram illustrating a method for supporting VM backup with multiple disk access according to one embodiment.

Referring now to FIG. 3, in one embodiment, a method performed by a computing device (for example, a backup application server) can include: maintaining a record (for example, in VM records 512 shown in FIG. 5) that includes restore points of a target virtual machine (VM) located at a VM server at block 302; receiving a request from a user to access requested restore points at block 304, and in response to the request: initiating a backup storage to build the restore points and corresponding addresses to the restore points at block 306, the requested restore points being located at a networked storage device; based on the retrieved network addresses, mounting at block 308 backup disks onto mount points of the target VM, and notifying at block 310 a user that the target VM has backup disks mounted.

Each mounted backup disk can correspond to a requested restore point of the target VM. Alternatively, the requested restore points can be mapped to the backup disks. In one embodiment, instead of backup disks, the storage device can use a single backup disk for multiple restore points.

Figure 4:
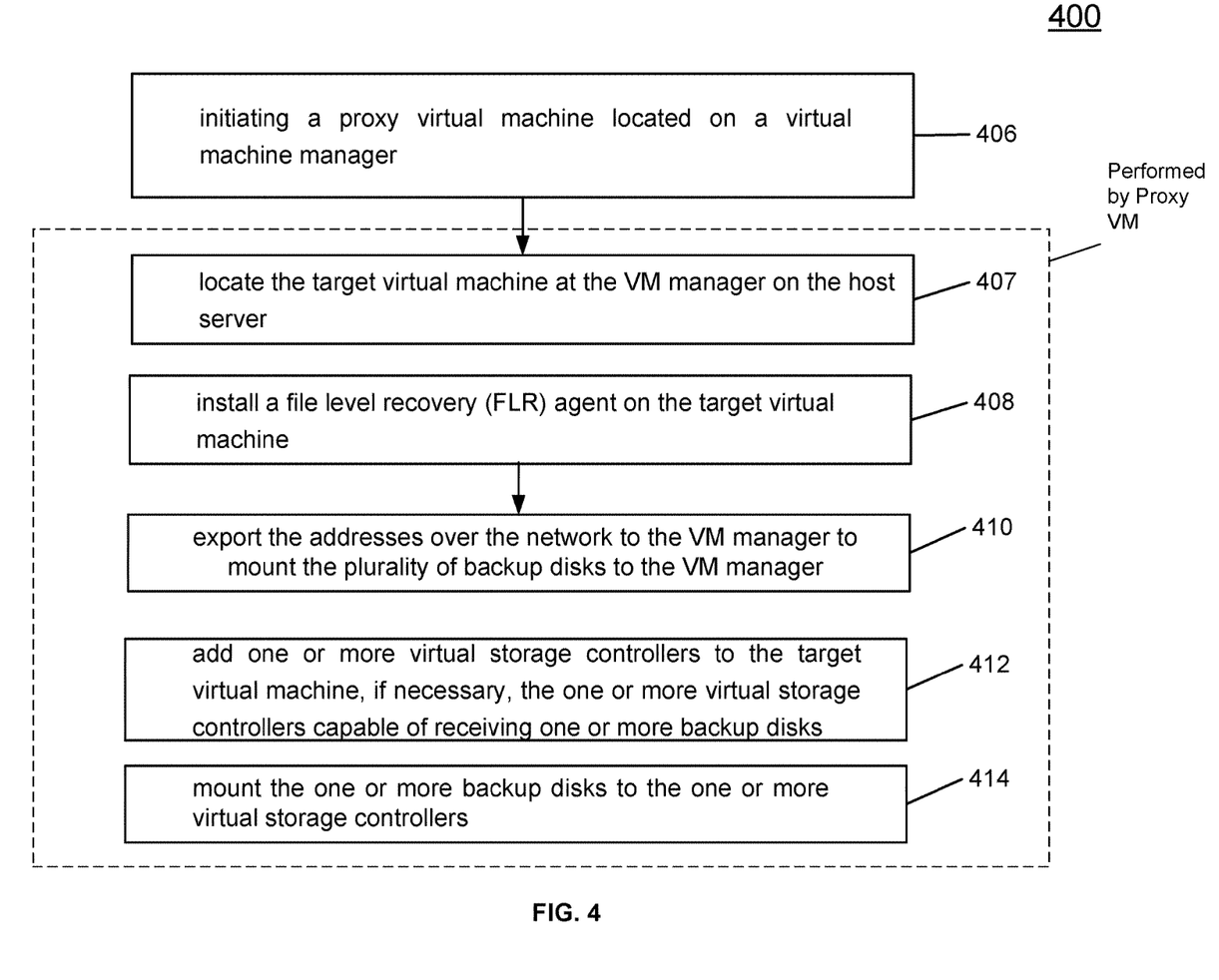
FIG. 4 is a flow diagram illustrating a method for mounting backup disks on a VM according to one embodiment.

Referring now to FIGS. 4 and 5, mounting 400 backup disks (for example, data stores 522) onto a target VM 568 can include initiating 406, by a computing device (for example, a backup application server 510) a proxy virtual machine 562 located on a virtual machine manager 554 to: locate 407 the target virtual machine at the VM manager.

The proxy virtual machine can have an FLR agent installer 566 and be configured to: install 408 a FLR agent 574 on the target virtual machine; export 410 the addresses of backup disks 522 to the VM manager to mount the backup disks to the VM manager, for example, as VM disks 580; add 412 one or more virtual storage controllers 582 to the target virtual machine if necessary, each virtual storage controller being capable of controlling one or more mounted VM manager datastores/backup disks (for example, VM disks having restore points of a target VM); and mount 414 each of the backup disks to one of the virtual storage controllers on VM mount points 584. A virtual storage controller can be, for example, a SCSI controller and the VM disks can be, for example, VM data stores.

The VM manager 554 can include a hypervisor 560 to create and manage the VMs, including the target VM 568, the proxy VM 562, and other VMs on the VM Manager.

In one embodiment, a user can initiate a FLR session with a backup server 510 from a user machine 502, for example, using a browser. The backup server can validate the user's credentials. The backup server can list, for example, on a user interface, VMs for which the user is authorized to access. The user can then select a client VM, to which the user wants to access backup files, and a target VM 568 where the user wants to attach backup disks. The backup server can authenticate the user for the target VM.

The backup server can maintain VM records 512 having mappings of VMs/clients to back-up files/restore points. Each backup-file can include a timestamp that corresponds to the time that the snapshot of the VM was taken. The backup server can present multiple backups to the user, for example, through a user interface 514, the backups each corresponding to a VM. In this manner, the user may select multiple backups for a given client/VM.

For example, a user may select one hundred backups to restore in a single action. In such an example, the user may have multiple files to be restored that are distributed across the one hundred backups/restore points.

The backup server can retrieve metadata for all the selected backups of the selected client VM and then connect to a data storage system 520. For example, the backup server can connect to a data domain. The backup server can then locate a path for each backup disk/restore point 522. The data storage can be, for example, a network attached storage (NAS).

All backup files 522 (for example, deduped files of image backups) are then built by the data storage system 520 and the paths are ready to be exported to a host/VMM 554.

The proxy VM 562 can now be initiated. The backup server can contact the proxy VM to locate the target VM on the VM manager. The proxy can contain an FLR agent installer 566 (including, for example, scripts in a repository) and install an FLR agent 574 on the target VM, for example, using VMware tools. The FLR agent installed on the target VM can be used by the backup server as a hook or entry point to restore files from backup.

The proxy VM can then export the paths built by the storage device. For example, the proxy VM can export the paths or addresses 524 over network file system (NFS) to the VM manager 554, for example, ESXi, and mount the backup files, for example, as ESXi data stores. Each of the paths can contain backup files (image disks of the client) taken at a different point in time.

The proxy VM 562 can hot-add necessary hardware, for example, virtual storage controllers 582, to the target VM after a pre-check. The pre-check can include a determination of the number of virtual storage controllers, for example, SCSI controllers, needed on the target VM based on the number of backups selected by the user and therefore, the number of image disks. For example, if a user selects 45 backups and each virtual storage controller can handle 15 disks each, then the proxy VM can determine that 3 virtual storage controllers are to be hot-added to the target VM.

At this point, the target VM is ready for the mount process. Each disk in the mounted backup files (for example, ESXi datastores) are attached to virtual nodes of the virtual storage controllers 582.

The FLR agent process inside the target VM is instantiated and creates mount points 584 after reading the filesystem inside each disk for all the new disks added to the virtual storage controller slots. Each mount point 584 is a VM replica at a different point in time, resulting in multiple backups mounted onto the target VM operating system and ready to be filtered by a user.

The backup server 510 now indicates to the user that the backups are successfully mounted on the target VM, for example, by a success prompt/message on a user interface.

A user can now login to the target VM and access files from the local file system quickly and efficiently, because the user can beneficially search the mounted disks together rather than separately. Once a user logs out from an FLR portal, the FLR agent can unmount all the disks on the target VM. The proxy VM can remove all the image disks and the data stores from the VM manager (for example, the ESXi).

Figure 7:
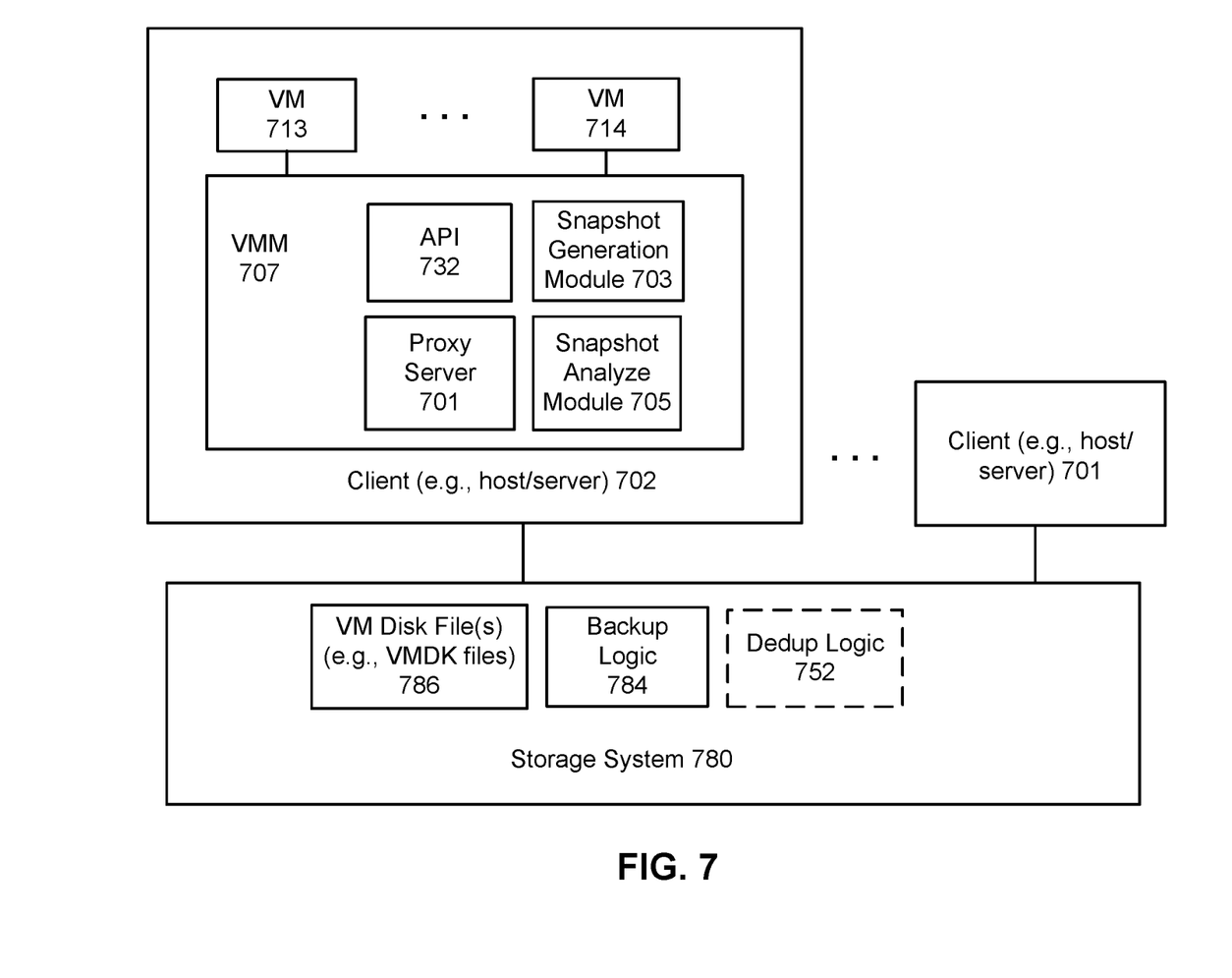
FIG. 7 is a block diagram illustrating a storage system and a client.

FIG. 7 shows a block diagram illustrating clients and a storage system according to one embodiment. VMM 707 includes, but is not limited to, API 732, proxy server 701, snapshot generation module 703, and snapshot analyze module 705. API 732 allows any external system to communicate with VMM 707. For example, backup application server 705 can send request to VMM 707 via API 732 to initiate a backup operation. In another example, backup application server 705 can establish a consistent state of a VM stored on client 702 and to request for a backup catalog of the VM via API 732. Proxy server 701 can let VMM 707 mount any VMs hosted on the client and to access files of the VMs. Snapshot generation module 703 can establish consistent states of VMs on the client. Snapshot analyze module 705 can analyze files from a snapshot. For example, backup application server 705 may send a backup request for VM 709 to VMM 707 via API 732. Snapshot generation module 703 of VMM 707 thereafter establishes a consistent state, or a snapshot, for VM 709. The snapshot may be one of VM disk files, or VMDK file 786. Proxy server 701 mounts the snapshot to allow file access to the snapshot. Snapshot analyze module 705 searches for one or more files to be excluded from the backup routine via the mounted VM disk file at proxy server 701. These one or more files can be searched by file names and or file directories. Once these files are located, snapshot analyze module 705 determines their file addresses and file sizes to substitute them with data pattern files that have the same file sizes.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
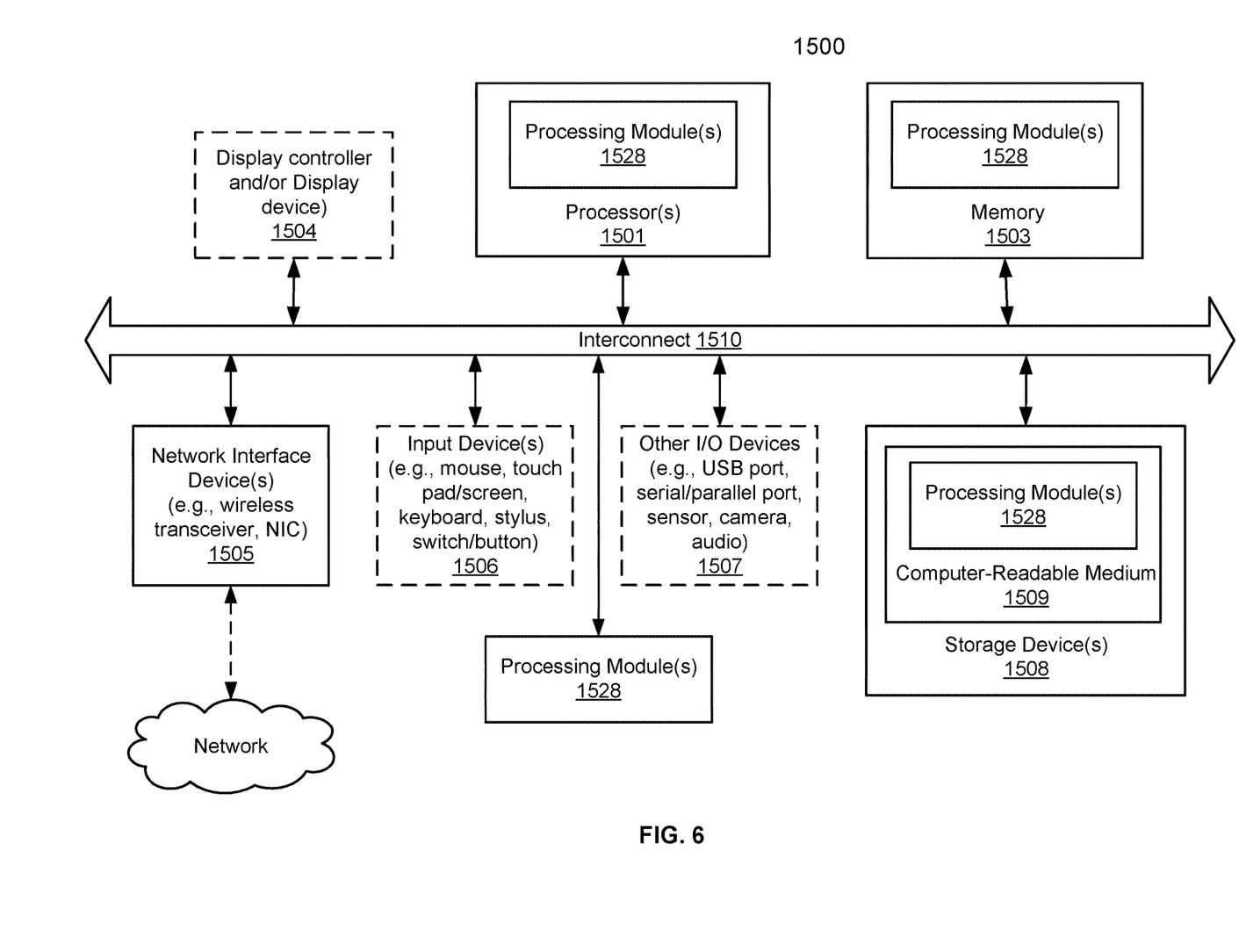
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems such as client 101, server 110, backup storage system 120, and VM Management Server 157 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, snapshot generation module 203, snapshot analyze module 205, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a computing device comprising:
maintaining a record of a plurality of restore points of virtual machines (VM);
in response to a request from a user to access a plurality of requested restore points of a selected VM:
initiating a backup storage to build the plurality of restore points and corresponding addresses to the plurality of restore points;
based on the addresses, mounting a plurality of backup disks onto a target VM residing on a host server which is a VM manager, the mounted backup disks containing image disks of the requested restore points of the selected VM, wherein the mounting of the plurality of backup disks onto the target VM includes initiating a proxy virtual machine located on the VM manager to a) locate the target virtual machine at the VM manager, b) install a file level recovery (FLR) agent on the target virtual machine, c) export the addresses over a network to the VM manager to mount the plurality of backup disks to the VM manager, and d) mount the plurality backup disks to one or more virtual storage controllers that are on the target virtual machine, each of the one or more virtual storage controllers capable of receiving one or more of the plurality of backup disks; and
notifying a user that the target VM has the plurality of backup disks mounted, such that the user can log into the target VM to access the backup disks without having to individually access the backup disks via separate VMs.

2. The method according to claim 1, wherein the proxy virtual machine is further initiated to
add additional one or more virtual storage controllers to the target virtual machine, if a number of the one or more virtual storage controllers is deemed insufficient for a number of the plurality of backup disks.

3. The method according to claim 2, wherein the FLR agent installed on the target VM creates mount points on the target VM for each mounted backup disk, each mount point, together with the mounted backup disk being a virtual machine replica of the target virtual machine at a different point in time.

4. The method according to claim 1, wherein the computing device, the VM manager and the data storage server are networked devices.

5. The method according to claim 1, wherein the one or more virtual storage controllers are small computer system interface (SCSI) controllers.

6. The method according to claim 1, wherein the VM manager includes a hypervisor configured to manage and maintain one or more virtual machines, each virtual machine having an operating system and one or more applications.

7. The method according to claim 4, wherein the computing device is in communication with the VM manager through a VM management server, the VM management server also being in communication with additional VM managers.

8. The method according to claim 1, wherein computing device is a networked backup server.

9. The method according to claim 1, further comprising requesting a VM platform to release data stores from the target virtual machine and the VM platform in response to a user ending an FLR session on the computing device.

10. The method according to claim 1, wherein the proxy VM determines a number of storage controllers to hot-add to the target VM based on a number of the plurality of backup disks.

11. A non-transitory machine-readable medium having instructions stored therein, which when executed by a processor, cause the processor to perform operations, the operations comprising:
maintaining a record of a plurality of restore points of virtual machines (VM);
in response to a request from a user to access a plurality of requested restore points of a selected VM:
initiating a backup storage to build the plurality of restore points and be ready to export addresses to the plurality of restore points;
based on the addresses, mounting a plurality of backup disks onto a target VM residing on a host server which is a VM manager, the mounted backup disks containing image disks of the requested restore points of the selected VM, wherein the mounting of the plurality of backup disks onto the target VM includes initiating a proxy virtual machine located on the VM manager to a) locate the target virtual machine at the VM manager, b) install a file level recovery (FLR) agent on the target virtual machine, c) export the addresses over a network to the VM manager to mount the plurality of backup disks to the VM manager, and d) mount the plurality of backup disks to one or more virtual storage controllers that are on the target virtual machine, each of the one or more virtual storage controllers capable of receiving one or more of the plurality of backup disks; and
notifying a user that the target VM has the plurality of backup disks mounted, such that the user can log into the target VM to access the backup disks without having to individually access the backup disks via separate VMs.

12. The non-transitory machine-readable medium according to claim 11, wherein the proxy virtual machine is further initiated to
add additional one or more virtual storage controllers to the target virtual machine, if a number of the one or more virtual storage controllers is deemed insufficient for a number of the plurality of backup disks.

13. The non-transitory machine-readable medium according to claim 12, wherein the FLR agent installed on the target VM creates mount points on the target VM for each mounted backup disk, each mount point, together with the mounted backup disk being a virtual machine replica of the target virtual machine at a different point in time.

14. The non-transitory machine-readable medium according to claim 11, wherein the computing device, the VM manager and the data storage server are networked devices.

15. The non-transitory machine-readable medium according to claim 11, wherein the one or more virtual storage controllers are small computer system interface (SCSI) controllers.

16. The non-transitory machine-readable medium according to claim 11, wherein the VM manager includes a hypervisor configured to manage and maintain one or more virtual machines, each virtual machine having an operating system and one or more applications.

17. The non-transitory machine-readable medium according to claim 11, wherein the computing device is in communication with the VM manager through a VM management server, the VM management server also being in communication with additional VM managers.

18. The non-transitory machine-readable medium according to claim 11, wherein computing device is a networked backup server.

19. A system comprising:
  a processing system having at least one hardware processor, the processing system coupled to a memory programmed with executable instructions that, when executed by the processing system, perform operations comprising:
  maintaining a record of a plurality of restore points of virtual machines (VM);
  in response to a request from a user to access a plurality of requested restore points of a selected VM:
  initiating a backup storage to build the plurality of restore points and be ready to export addresses to the plurality of restore points;
  based on the addresses, mounting a plurality of backup disks onto a target VM residing on a host server which is a VM manager, the mounted backup disks containing image disks of the requested restore points of the selected VM, wherein the mounting of the plurality of backup disks onto the target VM includes initiating a proxy virtual machine located on the VM manager to a) locate the target virtual machine at the VM manager, b) install a file level recovery (FLR) agent on the target virtual machine, c) export the addresses over a network to the VM manager to mount the plurality of backup disks to the VM manager, and d) mount the plurality of backup disks to one or more virtual storage controllers that are on the target virtual machine, each of the one or more virtual storage controllers capable of receiving one or more of the plurality of backup disks; and
  notifying a user that the target VM has the plurality of backup disks mounted, such that the user can log into the target VM to access the backup disks without having to individually access the backup disks via separate VMs.

20. The system according to claim 19, wherein the proxy virtual machine is further initiated to
  add additional one or more virtual storage controllers to the target virtual machine, if a number of the one or more virtual storage controllers is deemed insufficient for a number of the plurality of backup disks.

* * * * *